(No Model.) 2 Sheets—Sheet 1.
J. C. HENRY.
ELECTRIC RAILWAY.
No. 591,100. Patented Oct. 5, 1897.
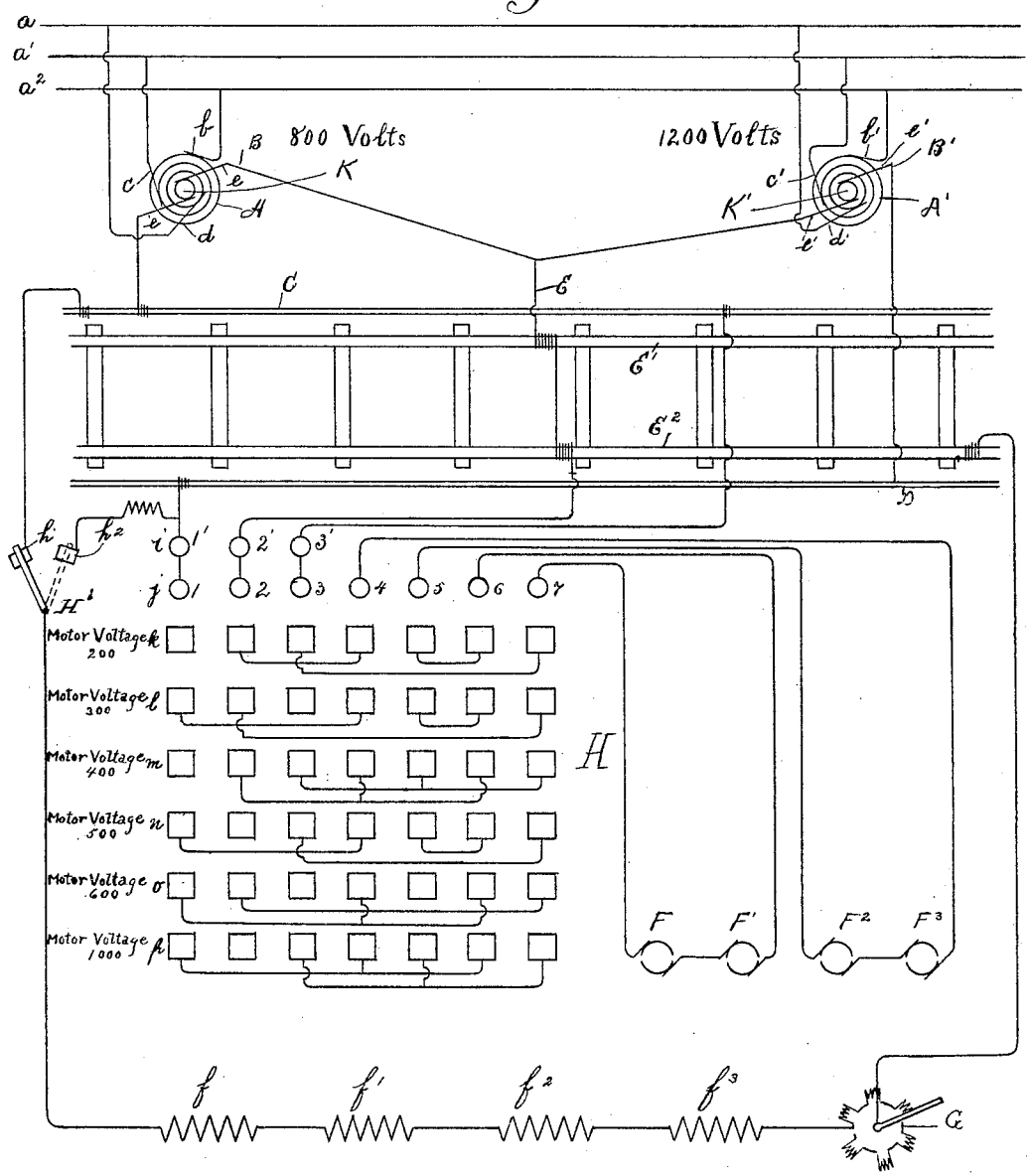
Fig. 1.
Fig. 3.
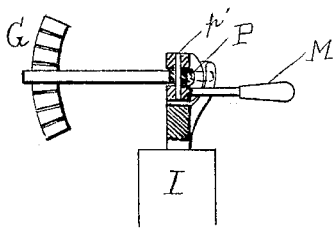
WITNESSES:
George H. Knight Jr.
W. H. Dumphrey.
INVENTOR
John C. Henry.

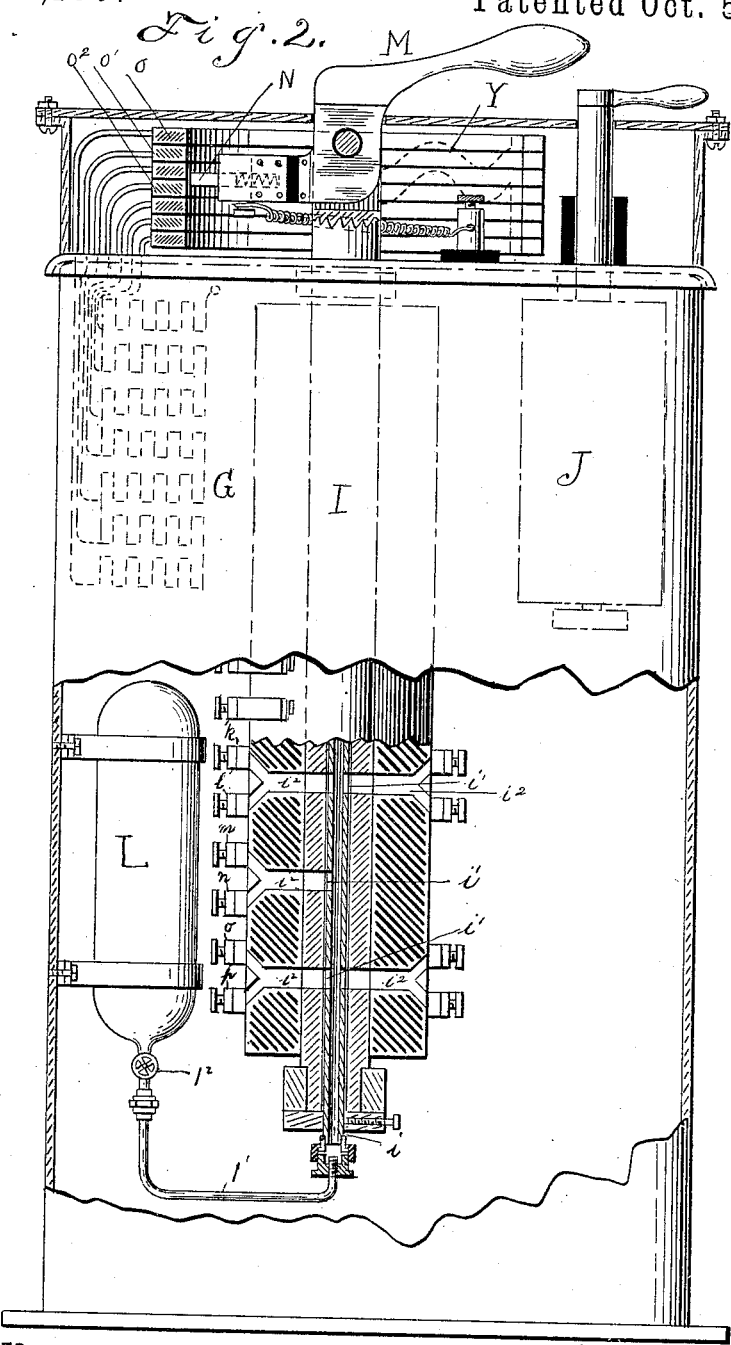

UNITED STATES PATENT OFFICE.

JOHN C. HENRY, OF DENVER, COLORADO.

ELECTRIC RAILWAY.

SPECIFICATION forming part of Letters Patent No. 591,100, dated October 5, 1897.

Application filed June 29, 1897. Serial No. 642,838. (No model.)

*To all whom it may concern:*

Be it known that I, JOHN C. HENRY, a citizen of the United States, residing at Denver, in the county of Arapahoe and State of Colorado, have invented certain new and useful Improvements in Electric Railways, of which the following is a specification.

My invention relates to improvements in electric railways, and has more particularly in view improvements in the controlling of electric motors and in apparatus therefor.

The invention is somewhat of an amplification of my Patent No. 545,158, improvements in electric railways, of August 27, 1895. In the system therein shown I exhibit a modification of the three-wire or compensating system of distribution, the controlling feature being that the generators on one side give a low electromotive force and on the opposite side they give a higher electromotive force, and means are provided whereby the traveling motors may take current either in series or in parallel with one or the other or with both sides of the said source of supply, so that the motors are provided with current at three distinct variable voltages.

In the present application I show plans for an electric-railway system of greater magnitude than those commonly in use and have provided for the following distinct advantages over the existing practice:

First. I have the advantages in low copper requirements of the ordinary three-wire system and at the same time avoid a number of objections which have been developed by the use of such a system for electric-railway work.

Second. I provide a duplicate system, so that in the event of trouble with the trolley, working conductor, or dynamo on one side the cars may proceed on the other side of the system around the break or defect without stopping. I also provide a novel method of braking the cars on descending a grade or when they are coming to a stop, which is so arranged that the energy instead of being destroyed by frictional contact on the wheels and brake-shoes is transferred back to the line and assists other motors which are being supplied from the same source.

In the drawings, Figure 1 represents a diagram of a complete system particularly suitable for long-distance transmission where heavy work is to be done. Fig. 2 represents a novel form of controller for regulating the motors. Fig. 3 shows a modification of the controller shown in Fig. 2.

$a$ $a'$ $a^2$ represent the three conductors of a high-voltage three-phase transmission-line.

A and A' represent a pair of rotary converters which receive their energy from the high-voltage three-phase line referred to and transform the same to direct current. The transformer A gives an output of eight hundred volts direct current to the trolley-wire C, while the transformer A' gives an output of twelve hundred volts to the trolley-wire D. The neutral wire E is connected to the track-rails E' and $E^2$.

F and F' represent the armatures of a pair of motors on one truck of an electric-motor car, while $F^2$ and $F^3$ represent the armatures of another pair of motors on the opposite truck. $f$, $f'$, $f^2$, and $f^3$ represent the field-magnets of the said motors.

H represents a development of the controller-cylinder. The numerous squares represent points of contact on the surface of said cylinder. The squares make contact with the stationary contacts 1, 2, 3, 4, 5, 6, and 7 on the line $j$. The field-magnets $f$, $f'$, $f^2$, and $f^3$ are separately excited and are shown connected in series with a rheostat G and receiving current from the low or eight-hundred-volt side of the three-wire system. When the line of contact $k$ engages with the line $j$, the armatures are connected in series with the eight-hundred-volt side of the system and are individually working under two hundred volts pressure. With the line of contact $l$ in engagement with the stationary contacts on the line $j$ the motors are connected in series with the twelve-hundred-volt side of the system. They are consequently each working under three hundred volts pressure. With the line of contact $m$ in engagement with the stationary contact on the line $j$ the motors are connected in series multiple with the eight-hundred-volt side of said system. They are consequently each working under four hundred volts pressure. With the line of contact $n$ in engagement with the stationary contacts on the line $j$ the motors are connected in series with both sides of said system in series. They are consequently each working under five hundred volts potential. With the line of contact o in engagement with the stationary line of contacts j the separate pairs of armatures are connected in parallel with the twelve-hundred-volt side of said system. They are consequently each working under six hundred volts pressure. With the line of contact p in engagement with the stationary contacts j the armatures are connected in parallel with both sides of the source of supply in series. They are consequently each working under one thousand volts electromotive force. It will be observed that with this arrangement I am enabled to give the motors six different running positions without using artificial resistance. In this connection it may be observed that the series-multiple controller in common use is capable of giving but two running positions, the balance of the steps or speeds being provided for by artificial resistance. In addition to this means of regulation I provide a practicable means of varying the magnetization of the field-circuit without directly interfering with the armature-current.

G represents a rheostat in the field-magnet circuit which is manually operated and is capable of increasing or decreasing the magnetization of the field-magnet, so as to further regulate the back electromotive force of the motors and to control the current-supply when working as motors or their voltage when working as generators.

H' represents a switch arranged normally to connect the field-magnets with the low or eight-hundred-volt side. In the event of trouble or derangement on this side the switch may be thrown as indicated by the dotted line and connect the field-magnets with the opposite side through permanent resistance, which preferably will be capable of reducing the voltage on this local line about thirty-three per cent., so as to avoid abnormal currents on the local field-magnet circuit.

The rotary converters are shown diagrammatically.

K and K' represent the commutators.

The three outer rings represent the collectors which connect with the three-phase circuit.

In Fig. 2 I represent my improved form of controller adapted to be manually operated and to make the numerous changes outlined in the previous description. It is different from the ordinary controller, being capable of increasing or decreasing the field magnetization at the same time that the motors are being connected in series or in parallel to or from the different sources of supply.

In the drawings, I represents the controller-cylinder, J the ordinary reversing-switch, and G the rheostat.

L is a cylinder containing a fluid under pressure.

M represents the controller-handle capable of being moved horizontally in a circular fashion or vertically. The rheostat shown at G within the controller, Fig. 2, is the same as that shown diagrammatically at G in Fig. 1. By working the lever M vertically the brush or contact-maker N cuts the resistance in or out by making engagement with the circular segments O O' O². By revolving the handle M in the same plane the field resistance is not varied, but the different changes are effected in the armature and three-wire circuits. In order to avoid flashing at the points of contact, I arrange to break the circuit in an atmosphere that will not support combustion and arrange to rupture any tendency to arc with the gas under high pressure which is normally confined under high pressure. I prefer for this purpose to use carbonic-acid gas, it being a cheap commercial product and peculiarly suitable for the purpose. The said gas is contained in vessel L, preferably under high pressure, and the hand-valve $l^2$ being normally open the gas flows through pipe $l'$ to pipe $i$ in the interior of the controller. Pipe $i$ is stationary and has narrow slits or ports $i'$, which register with corresponding passages $i^2$ in the controller-cylinder. The passages $i^2$ open at the outside of the controller-cylinder, directly in the rear of the contacts $k$ $l$, &c., thereon, and the ports are so arranged that the gas is allowed to escape just as the contacts are breaking circuit. The sudden flow of carbonic-acid gas acts to extinguish the arc both by mechanical displacement and by its cooling effect, and the fact that it is a non-supporter of combustion aids materially in preventing oxidation of the contacts. The latter being inclosed in the controller-casing, the space in said casing soon becomes more or less of a combustion-extinguishing nature.

Fig. 3 shows a modification of the combined controller and rheostat handle, the handle M in this case being connected to the controller-shaft by a gimbal-joint P, to whose pin $p'$ the rheostat-handle is secured, thus giving the same independence of operation of controller and rheostat as with the device shown in Fig. 2.

The use of the three-wire system in railway practice has been somewhat objectionable, the difficulty being to maintain a balance or something near it. In the system described each motorman is in position to help maintain the balance, while under ordinary circumstances perhaps three-fourths of the work is performed; that is, when the motors are in series with both sides, no regulation is required to help maintain a balance, so that the only precaution which is necessary is when the motormen are changing speed and dealing with the high or low side of the system. While the arrangement herein shown requires a double trolley, it provides for the operation of the cars on one side of the system in the event of disablement of the opposite side. Should any trouble occur to the trolley, working conductor, or dynamos on one side, the cars may proceed on the other side without stopping. I am aware that heretofore it has been proposed to utilize shunt-wound motors for railway purposes, so that when coming to a stop or on descending grade they will pump back into the line and assist other cars onward. The objections to the shunt-wound motor for this purpose are that the field-magnets are necessarily wound with very fine wire and the self-induction for such magnets is correspondingly high. The voltage of the secondary effect on breaking the circuit, being much higher than the initial, endangers the insulation of the machine. To overcome this objection, I wind my field-magnets with a (comparatively speaking) coarse wire, and I arrange a number of those fields in series and excite them from a source of supply much below the maximum. While it is common to operate series motors in series, multiple series, and in parallel, they are not suitable to work as dynamos or motors, as the conditions may require, for the reason that the speed of the armatures interferes with or controls the field's magnetization.

With separately-excited motors the field magnetization may remain unchanged, while the armature will give or take current in turn, as desired. The voltage of the armatures may be changed by connecting them from parallel to series, for instance. They are also provided with circuits most suitable for their most efficient output, by directing their current to any one of the three circuits—that is, to the eight-hundred volt, to the twelve-hundred volt, or to the two-thousand volt lines. In practice suppose we wish to avail ourselves of this method to brake the train. We will assume the car is running along at high speed, with the motors in parallel. Now by connecting them from parallel to series their combined voltage is higher than the initial. Consequently they generate a current and assist the station-dynamos. This work decreases the speed of the car until a point is reached where the back electromotive force and the initial would be balanced. Now to further check the car the motors may be connected in parallel to the twelve-hundred-volt side of the system. Then as the speed is again decreased the motors may be changed from parallel to series. The next step would be to connect them with the low or eight-hundred-volt side in parallel, and then as the speed decreased connect them to the same side in series. To avoid mechanical shocks or abnormal rushes of current in these changes, the resistance of the field-magnetizing circuit may also be varied. This may be effected by means of rheostat G and switch M, as explained, the motorman raising or depressing the handle, as required, or if it is not desired to leave the adjustment of resistance to his discretion means may be provided for causing the switch-contact N to move over the corresponding fixed contacts as the controller is shifted from one position to another. Thus, as indicated at Y in dotted lines, a cam may be provided engaging with the contact and constraining its movement in any manner desired, so as to introduce or cut out resistance at the proper points.

In general, with motors adapted to work on six hundred volts the last step in the controller shown, putting the motors on one thousand volts each, may be omitted.

It will be understood that instead of the pairs of motor-armatures constantly in series a single motor wound for equivalent potential or any desired grouping of motors may be used. In fact, any two or more of the motive devices shown may be coalesced into a single motor capable of having the number of its poles and thus its speed or voltage changed. The switch connections then lead to the several parts of this motor, so that the same may be put in series or parallel relation. In such an arrangement the several motive parts are considered an electromotor within the meaning of my claims.

As above stated, the motor-fields are in a circuit independent of the armature-circuits, and this is an essential feature, as it enables the motors to work as generators, as above specified. For the purpose indicated, however, this independence may be secured in any desirable way, either by supplying the fields from a separate source or by putting them in shunt with the armatures. As a matter of fact, the disposition above described embodies both shunt and separate excitation, the fields being at times in shunt relation to the armatures and at other times in a separately-excited relation. As compared, however, with the systems that have heretofore been proposed for use of shunt-motors on railway-work, my system has the advantage that it does not require such large field-magnets for the motors. The reason for this is that the usual system using shunt-motors requires a field-magnet which when the motor is in normal operation is much below the point of saturation, so that when it is desired to make the motor work as a generator the field magnetization may be strengthened sufficiently to raise the back electromotor force to the required degree. In my system, however, where the required change in ratio of motor and line electromotor forces is brought about by shifting the motor to a different line potential, it is possible to run the field constantly at a point comparatively near saturation, thus enabling a smaller field-magnet to be used.

An additional advantage of the magnetization of the motor-fields by a circuit independent of the armature-circuits is that the said magnetization is thus rendered independent of the armature-circuit, and the weakening of the fields by racing or slipping of the motors is thus avoided. In fact, the connection of the several fields in a common circuit independent of the armature effectually ties all of the motors together electrically, so that unequal action is largely prevented.

Having thus described my invention, what I claim as new, and desire to secure by Letters Patent, is—

1. In an electric-railway system, the combination with a plurality of electric supply-circuits, of a series of motors having their fields excited from one of said circuits by a circuit independent of the armature-circuits, and variable connections between the supply-circuits and the armatures of said motors.

2. In an electric-railway system, the combination with a plurality of electric supply-circuits, of a series of motors having their fields excited from one of said circuits by a circuit independent of the armature-circuits, means for regulating the strength of current in said field-circuit, and variable connections between the supply-circuits and the armatures of said motors.

3. In an electric-railway system, the combination with a plurality of circuits supplying electricity at different potentials, of a series of electric motors having their field-magnets energized from the supply-circuit of lowest potential, by a circuit independent of the armature-circuits, and variable connections between the supply-currents and the armature-currents.

4. The combination with an electric supply-current, of a plurality of electric motors connected thereto and having their field-magnets excited by a current independent of the armature-currents, and controlling devices for connecting the armatures of said motors in series or parallel relation.

5. The combination with a plurality of motors, of a controller adapted to place the motor-armatures in series or in parallel, in combination with a rheostat, arranged to independently vary the resistance of the field-magnet circuit of said motors.

6. The combination with a plurality of motors, of a controller adapted to place the motor-armatures in series or in parallel, in combination with a rheostat arranged to independently vary the resistance of the field-magnet circuits and a single lever operating both said controller and said rheostat.

7. The combination with a plurality of circuits and an electric motor, of a controller adapted to variably connect the armature of said motor to the several circuits, and a rheostat connected with the field-magnet in an independent circuit and adapted to vary the resistance of said circuit, and a single handle controlling the motor of both said controller and said rheostat.

8. The combination with an electric-circuit breaker, of a casing inclosing the same and a means for supplying in said casing an atmosphere incapable of supporting combustion.

9. The combination with a circuit-breaker of a source of compressed carbonic-acid gas and means for directing said gas to a point where the circuit is broken.

JOHN C. HENRY.

Witnesses:
M. V. BIDGOOD,
J. GREEN.